United States Patent
Doerr et al.

(10) Patent No.: US 7,327,956 B2
(45) Date of Patent: Feb. 5, 2008

(54) METHOD AND APPARATUS FOR MITIGATING INTERSYMBOL INTERFERENCE FROM OPTICAL FILTERING

(75) Inventors: Christopher Richard Doerr, Middletown, NJ (US); Daniel A. Fishman, Lakewood, NJ (US); Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 533 days.

(21) Appl. No.: 10/955,229

(22) Filed: Sep. 30, 2004

(65) Prior Publication Data

US 2006/0067695 A1    Mar. 30, 2006

(51) Int. Cl.
*H04J 14/02*    (2006.01)
(52) U.S. Cl. .......................... 398/81; 398/149
(58) Field of Classification Search ................ 398/81, 398/147, 149, 159
See application file for complete search history.

(56) References Cited

U.S. PATENT DOCUMENTS

2002/0191268 A1   12/2002   Seeser et al. ............... 359/260
2004/0252963 A1*  12/2004   Rohde ......................... 385/147

FOREIGN PATENT DOCUMENTS

DE    102 02 142 A1    8/2004
EP    1 168 010 A    1/2002

OTHER PUBLICATIONS

M. Oguma et al., "Compact And Low-Loss Interleave Filter Employing Lattice-Form Structure And Silica-Based Waveguide", *Journal of Lightwave Technology*, vol. 22, No. 3, Mar. 2004, pp. 895-902.
R. Ryf et al., "Data Rate And Channel Spacing Flexible Wavelength Blocking Filter", *OFC'04*, post-deadline paper PDP10, 2004.
C. K. Madsen et al., "Optical All-Pass Filters For Phase Response Design With Applications For Dispersion Compensation", *IEEE Photonics Technology Letters*, vol. 10. No. 7, Jul. 1998, pp. 994-996.
D. J. Moss et al., "Multichannel Tunable Dispersion Compensation Using All-Pass Multicavity Etalons", *Proc. OFC'02*, Mar. 2002, pp. 132-133.
K. Ennser et al., "Influence of Nonideal Chirped Fiber Grating Characteristics on Dispersion Cancellation", *IEEE Photonics Technology Letters*, vol. 10, No. 10, Oct. 1998, pp. 1476-1478.
C. Scheerer et al., "System Impact Of Ripples In Grating Group Delay", *ICTON'99*, paper We.B.5, pp. 33-36.
N. M. Lichinitser et al., "Tunable Dispersion Compensation Devices: Group Delay Ripple And System Performance", *Proc. OFC'03*, vol. 1, pp. 163-164.

(Continued)

*Primary Examiner*—Christina Leung (57) ABSTRACT

A method and apparatus for mitigating intersymbol interference (ISI) from narrow-band optical filtering and improving transmission performance by filtering multichannel optical signals using an optical filter device that exhibits a desired loss ripple in the transmittance profile of the filter passband.

13 Claims, 5 Drawing Sheets

OTHER PUBLICATIONS

X. Liu et al., "Impact Of Group-Delay Ripple In Transmission Systems Including Phase-Modulated Formats", *IEEE Photonics Technology Letters*, vol. 16, No. 1, Jan. 2004, pp. 305-307.

D. Penninckx et al., "Optically Preamplified Systems: Defining A New Eye Aperture", *OFC'98 Technical Digest*, paper WM36, pp. 220-221.

C. R. Doerr et al., "Simple Multichannel Optical Equalizer Mitigating Intersymbol Interference For 40-Gb/s Nonreturn-To-Zero Signals", *Journal of Lightwave Technology*, vol. 22, No. 1, Jan. 2004, pp. 249-256.

C. R. Doerr et al., "40-Channel Multi/Demultiplexer With Dynamic Passband Shape Compensation", *IEEE Photonics Technology Letters*, vol. 13, No. 7, Jul. 2001, pp. 690-692.

* cited by examiner

METHOD AND APPARATUS FOR MITIGATING INTERSYMBOL INTERFERENCE FROM OPTICAL FILTERING

BACKGROUND OF THE INVENTION

The present invention relates generally to optical transmission, and more particularly to methods and apparatus for mitigating penalties due to intersymbol interference (ISI).

The optical add/drop multiplexer (OADM) is a key enabler for flexible wavelength management in wavelength division multiplexed (WDM) transmission systems. However, high data rate transmission systems (e.g. 40-Gb/s) that include multiple OADMs in series or other devices that provide narrow-band optical filtering can suffer from significant ISI due to the narrow-band optical filtering. ISI is the spreading of the signal in each bit slot to other bit slots. This spreading closes the eye opening in digital transmission systems and leads to degraded system performance.

One prior art solution to mitigate ISI from narrow-band optical filtering is to use a transmission format with a narrower optical bandwidth. However, it is not always feasible or desirable to use narrow-band transmission formats, since such transmission formats can be more sensitive to nonlinearity and noise. Additionally, such solutions are not applicable to systems using conventional (non narrow-band) modulation formats.

Another prior art solution is to use an electronic equalizer. However, the effectiveness of electronic equalization is fundamentally limited because of the loss of optical phase information upon conventional square-law detection. Furthermore, electronic equalization at 40 Gb/s and above normally requires electronics with a bandwidth larger than 80 GHz, and is impractical in many applications.

Another prior art solution is to use an equalizer apparatus to provide optical equalization of a distorted signal after optical filtering. Such an apparatus is discussed in "*Simple Multichannel Optical Equalizer Mitigating Intersymbol Interference for* 40-*Gb/s Nonreturn-To-Zero Signals*" by C. R. Doerr, et. al. The proposed optical equalizer is introduced as an additional optical component to compensate for the previously induced ISI penalties, and employs Mach-Zehnder interferometers. Such a solution, however, may not be appropriate for all commercial applications.

BRIEF SUMMARY OF THE INVENTION

The present invention provides a method and apparatus for mitigating the ISI penalty resulting from narrow-band optical filtering. In one preferred embodiment an apparatus for transmission of multichannel optical signals is provided. The apparatus includes an optical filter device for narrow-band optical filtering. The optical filter device exhibits a desired loss ripple in the transmittance profile of the filter passband so as to mitigate ISI from the narrow-band optical filtering, and improve the transmission performance for one or more channels of the multichannel optical signals.

In a preferred embodiment of a method according to the present invention, multichannel optical signals are narrow-band filtered using an optical filter device. The optical filter device exhibits a desired loss ripple in the transmittance profile of the filter passband so as to mitigate ISI from the narrow-band filtering and improve the transmission performance for one or more channels of the multichannel optical signals

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings.

DETAILED DESCRIPTION OF THE INVENTION

The frequency-dependent amplitude modulation associated with a LR can be generally expressed as a Fourier sum of sine functions, with each being $$l_{LR}(f) = -\frac{l_{pp}}{2}\sin(2\pi f/f_p + \phi_0), \quad (1)$$

where $l_{pp}$ and $f_p$ are the LR component's peak-to-peak amplitude in dB (to follow the conventional loss ripple specification) and period, respectively, and $\phi_0$ is the phase of the LR which is related to the offset between the signal frequency and its nearest transmittance peak. (LR, as used herein, refers to the peak-to-peak variation of a filter's passband response.) f=0 is chosen for the center frequency of the signal; thus, from Eq. (1), $\phi_0=\pi/2$ when a transmittance peak coincides with the signal's spectral center. We can write the LR distorted temporal profile of a single pulse (a "one") as:

$$b(t) = \int_{-\infty}^{\infty} A(f) e^{j2\pi ft} \cdot e^{\ln(10) l_{LR}(f)/10} df, \quad (2)$$

where A(f) is the Fourier transform of a(t), which is the temporal profile of the original pulse.

Using the generating function of Bessel functions, $$\exp(z(t-1/t)/2) = \sum_{n=-\infty}^{\infty} J_n(z) t^n, \qquad (3)$$

where $J_n(z)$ is the Bessel function of the first kind, we have:

$$e^{l_{LR}(f)} = \exp\left\{\frac{\ln(10)l_{pp}}{40j}[e^{j(2\pi f/f_p+\phi_0)} - e^{-j(2\pi f/f_p+\phi_0)}]\right\} \qquad (4)$$

$$= \sum_{n=-\infty}^{\infty} J_n\left(\frac{\ln(10)l_{pp}}{20j}\right) e^{jn(2\pi f/f_p+\phi_0)}$$

Keeping the $1^{st}$-order terms for small/moderate LR-induced distortions, we obtain (by using $J_0(z)=1$ and $J_{\pm 1}(z)=\pm z/2$)

$$b(t) \approx a(t) + \frac{\ln(10)l_{pp}}{40} \cdot \qquad (5)$$

$$\{a(t+1/f_P)\exp[j(\phi_0-\frac{\pi}{2})] + a(t-1/f_P)\exp[-j(\phi_0-\frac{\pi}{2})]\}$$

Eq. (5) manifests that, to the first order, the distorted pulse consists of the original pulse and two scattered pulses which have a common relative amplitude of $\ln(10)l_{pp}/40$, and phases and delays of $\pm(\phi_0-\pi/2)$ and $\pm 1/f_p$, respectively. It is noted that, although LR acts in a similar manner to group-delay ripple (GDR) in terms of scattering satellite pulses that are temporally $\pm 1/f_p$ away from the original pulse, the amplitude and phase of the LR-induced satellite pulses behave differently as compared to those induced by GDR. More specifically, the amplitude of the LR-induced satellite pulses is independent of the ripple period, so there is always strong ISI whenever the signal bit rate (BR) is a multiple of the LR period, or $f_p=BR/n$, where $n=1,2,3\ldots$. This causes an "oscillation behavior" in the penalty dependence on $f_p$ when $f_p$ is smaller than the BR, which is different from the GDR case where the worst penalty occurs only when the BR is close to the GDR period. On the other hand, as the ripple period increases beyond the BR, the time offset between the original pulse and the scattered pulses becomes smaller than the bit period T (T=1/BR), and the LR-induced ISI decreases quickly. In addition, the phases of the LR-induced satellite pulses behave interestingly. For $\phi_0=\pi/2$ (or where the signal frequency coincides with a transmittance peak), the two satellite pulses are both in phase with the original pulse. (Narrow-band optical filtering can be seen as a special case for $\phi_0=\pi/2$.) For $\phi_0=3\pi/2$ (or the signal frequency coincides with a transmittance valley), the two satellite pulses are both out of phase with the original pulse. This can be used advantageously to mitigate the penalty caused by narrow-band optical filtering.

FIGS. 1A-D show the simulated eye diagrams of an RZ-OOK transmission with the distortion from a LR having $l_{pp}=5$ dB and $f_p=1\times$ BR. The duty-cycle of the pulse is assumed to be 33%. At $\phi_0=0$ or $\pi$, the phase difference between a "one" and its satellites is $\pi/2$, and the "zeros" are much more degraded than "ones". At $\phi_0=\pi/2$ ($3\pi/2$), the phase difference is 0 ($\pi$), and "ones" are much more degraded than "zeros". Differential phase-shift keyed (DPSK) transmission is also found to be similarly impacted by LR (as OOK).

The LR-induced OSNR penalty in systems with optically pre-amplified receivers was also assessed. The penalty factor can be defined as follows:

$$P(\mathrm{dB}) = 20\log\left[1 - \frac{\ln(10)l_{pp}}{40} \cdot c_{EC} \cdot a(\mathrm{rem}(1/f_p, T))/a(0)\right], \qquad (6)$$

which is correlated with the optical signal-to-noise ratio (OSNR) penalty assuming the noise distribution is Gaussian-like in the optical field domain. The term $\mathrm{rem}(1/f_p, T)$ is the remainder after division of $1/f_p$ by T, representing the temporal distance between each of the satellite pulses and its nearest bit center. For simplicity, linear transmission and ideal receiver are assumed. It should be noted that unlike the case with GDR, it cannot be assumed that the penalty from the LR is short-ranged because of the "oscillation behavior" mentioned above. Here, $c_{EC}$ is the worst eye-closure coefficient in the field domain. For OOK systems (without phase modulation), after some simplifications:

$$c_{EC\_OOK} = \max[0, -\sin(\phi_0)] + \max[1, 2|\sin(\phi_0)|], \qquad (7)$$

where the first term, $\max[0, -\sin(\phi_0)]$, corresponds to the degree of ISI on "ones", and the second term, $\max[1, 2|\sin(\phi_0)|]$, corresponds to the degree of the worst ISI on "zeros" in the patterns "100" and "101". When calculating the OSNR penalty or the eye-closure coefficient, it was assumed that the signal power is re-normalized after experiencing the LR.

For DPSK systems, there are two types of "eye-closures", one in the signal amplitude and the other in the differential phase between two adjacent bits. After some derivations, we have the overall eye-closure coefficient due to LR for DPSK $$c_{EC\_DPSK} = \max(2|\sin(\phi_0)|, 4|\cos(\phi_0)|/\pi), \qquad (8)$$

where $|2\sin(\phi_0)|$ corresponds to the worst degree of amplitude eye-closure, and $4|\cos(\phi_0)|/\pi$ corresponds to the worst degree of differential-phase eye-closure.

Figure 1A:
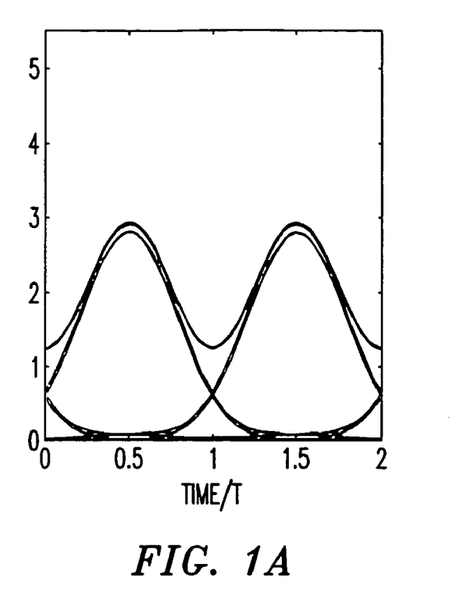
FIGS. 1A-D are simulated eye diagrams for transmission of return-to-zero on-off keyed (RZ-OOK) optical signals.
Figure 1B:
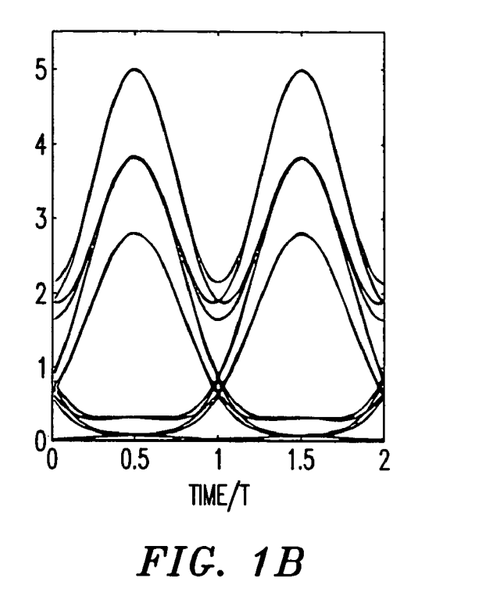
Figure 1C:
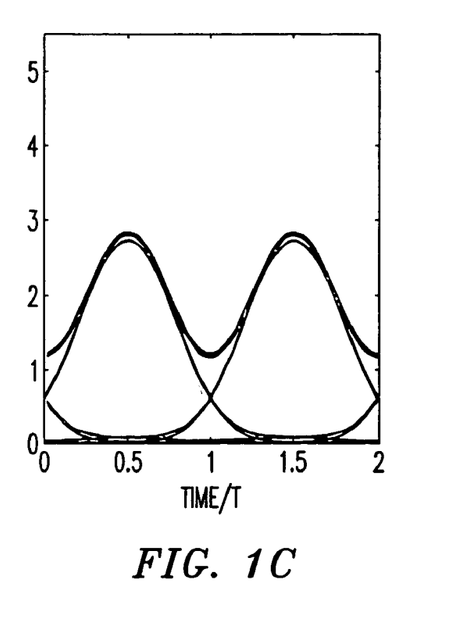
Figure 1D:
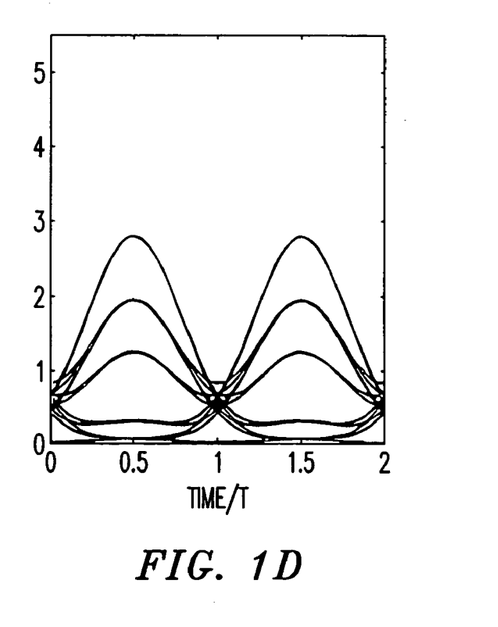
Figure 2A:
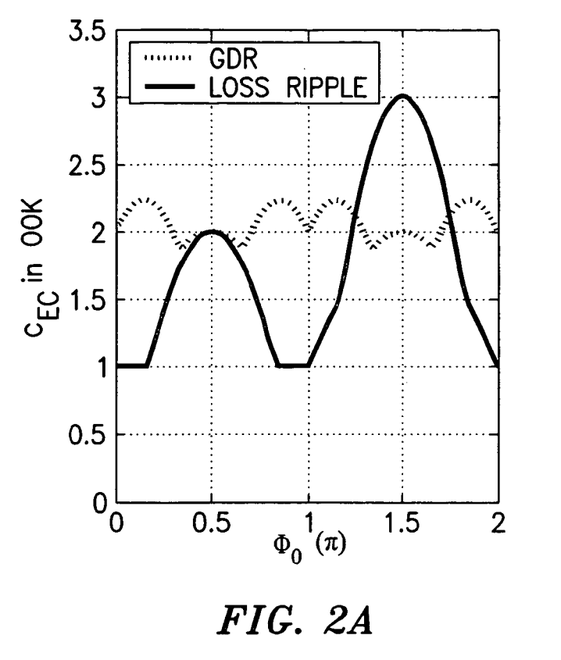
FIGS. 2A-B are plots showing the dependence of the overall eye closure penalty coefficients in $\phi_0$ in OOK and DPSK systems.
Figure 2B:
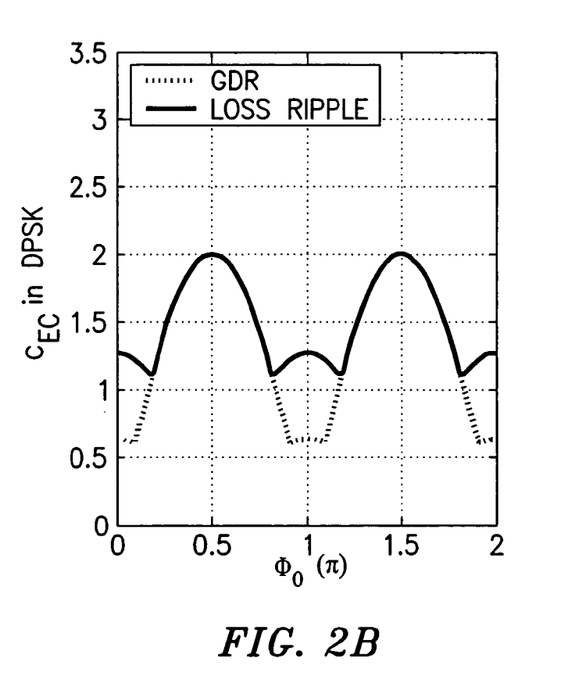

FIGS. 2A-B show the dependence of the overall eye closure penalty coefficients (for both LR and GDR) on $\phi_0$ in OOK and DPSK systems. Indeed, LR behaves differently as compared to GDR.

Figure 3:
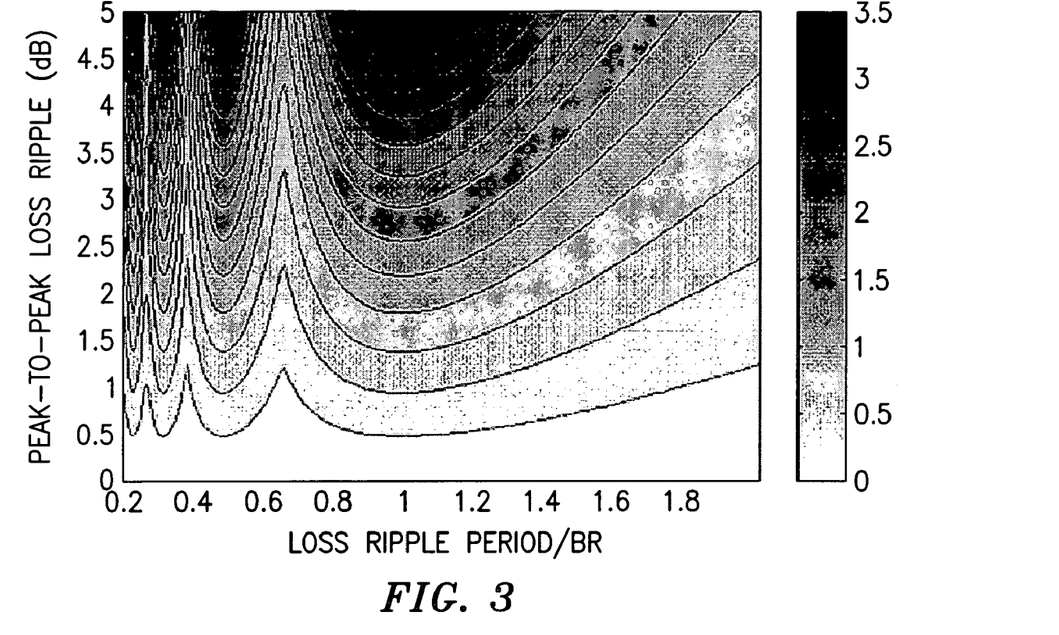
FIG. 3 is a contour plot of the dependence of the loss ripple (LR)-induced optical signal-to-noise ratio (OSNR) penalty on ripple period and amplitude at $\phi_0 = \pi/2$ (or $3\pi/2$)

FIG. 3 shows a contour plot of the dependence of LR-induced OSNR penalty (in dB) on GDR period and amplitude at $\phi_0=\pi/2$ (or $3\pi/2$). The previously mentioned "oscillation behavior" is thus observed. The transmitter was assumed to be ideal. Those skilled in the art will appreciate that if the transmitter has a finite extinction ratio, the interference (or phase difference) between the scattered pulses and the signal fields on "zeros" may be important and needs to be considered.

As discussed previously, a LR with $\phi_0=3\pi/2$ has the opposite impact to that with $\phi_0=\pi/2$, and a transmittance dip (a LR with $\phi_0=3\pi/2$) in the passband center can substantially cancel some of the ISI from narrow-band filtering.

Testing was performed to verify aspects of the invention. A 42.7 Gb/s NRZ-DPSK signal was passed through two interleavers (ILs) having a flat-top (~$3^{rd}$-order super-Gaussian) channel passband with 43 GHz 3-dB bandwidth.

Figure 4:
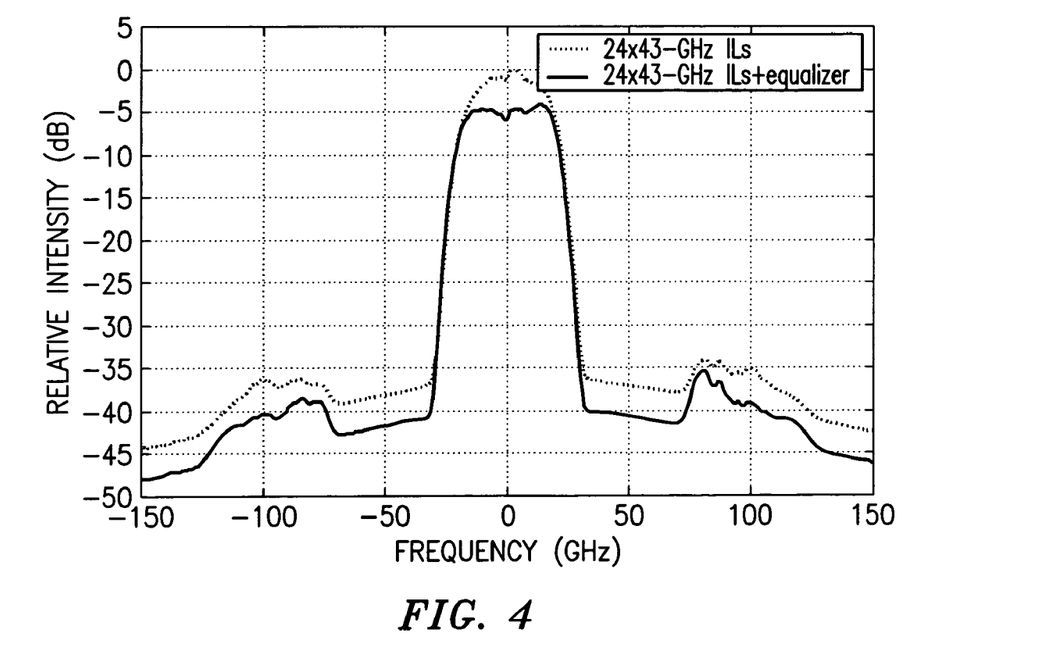
FIG. 4 is the measured optical spectra of a 42.7-Gb/s NRZ-DPSK signal after passing through two interleavers with and without LR.

FIG. 4 shows the measured signal spectra after passing through the two ILs with and without the presence of a LR with $l_{pp}=5$ dB, $f_p=50$ GHz, and $\phi_0=3\pi/2$. The LR was generated by an optical equalizer with two cascaded 20-ps delay-line interferometers, each having a variable splitting ratio and a differential phase control. Although LR is usually accompanied by GDR, the design of the LR generator used in the experimental testing intrinsically allows GDR-free operation. The measured peak-to-peak GDR was only ~1 ps, causing negligible additional penalty.

Figure 5A:
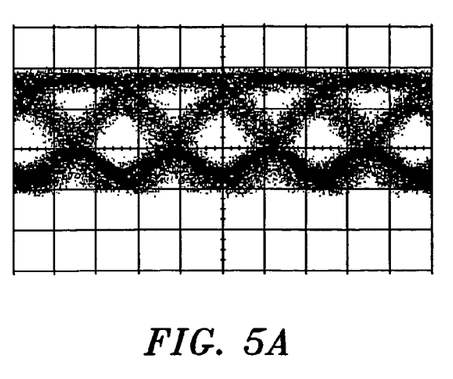
FIGS. 5A-B are measured eye diagrams of a narrow-band filtered 42.7-Gb/s NRZ-DPSK signal with and without LR, respectively.
Figure 5B:
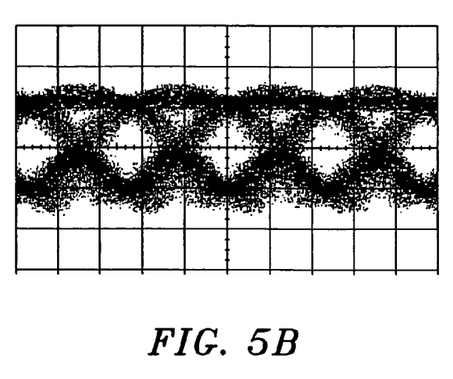

FIGS. 5A-B show the measured eye diagrams of a narrow-band filtered 42.7-Gb/s NRZ-DPSK signal without and with the LR, respectively. The eye obtained with the LR is more open and more symmetric than without the LR. An OSNR margin improvement of ~0.9 dB was obtained (at BER=6E-5) (with individual decision threshold optimization). The LR generator produces a periodic LR, which can be used to mitigate the filtering penalty simultaneously for all the WDM channels.

Figure 6A:
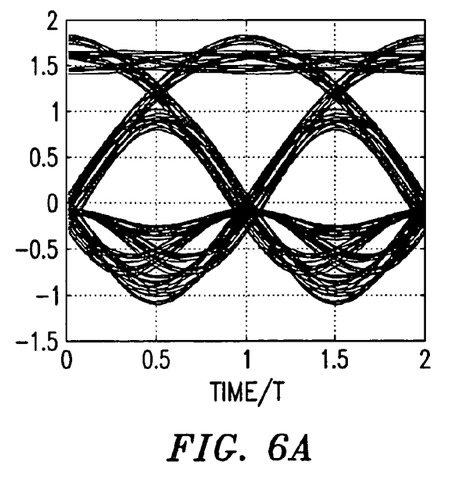
FIGS. 6A-B are simulated eye diagrams of a 42.7-Gb/s NRZ-DPSK signal after 6 cascaded interleavers (ILs) without and with LR, respectively.
Figure 6B:
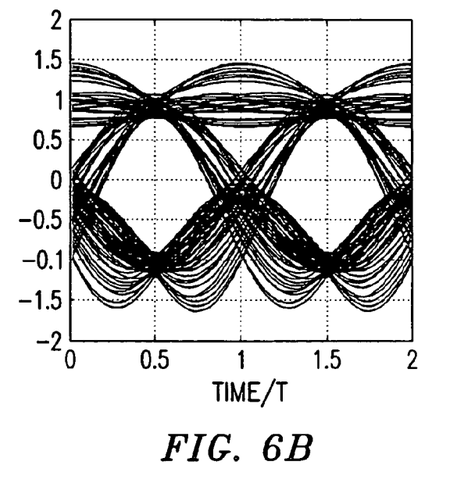

Further testing was performed to test system level performance of aspects of the present invention. FIGS. 6A-B show the simulated eye diagrams of a 42.7-GHz NRZ-DPSK signal after passing through 6 cascaded ILs having 50 GHz 3-dB bandwidth (3-order super-Gaussian-like). The OSNR margin was improved by ~1.5 dB when a transmittance dip, TD=0.5 dB was used with each IL.

Thus, in accordance with aspects of the invention, a special kind of loss ripple, generating a transmittance dip in a filter's passband, can be used to mitigate the penalty associated with narrow-band optical filtering.

Figure 7:
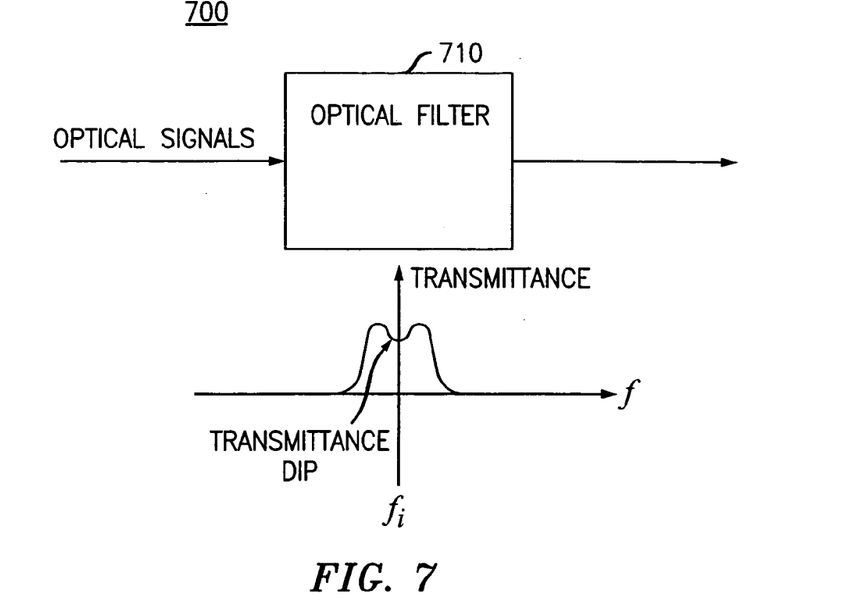
FIG. 7 is block diagram of an optical filter device according to one embodiment of the invention.

FIG. 7, illustrates an optical filter device 700 for filtering WDM optical signals in accordance with one embodiment of the invention. The optical filter 710 exhibits a desired transmittance dip in the transmittance profile of the filter passband for the i-th channel (as illustrated in the inset plot of FIG. 7). The transmittance dip of the optical filter device 700 is preferably selected so as to mitigate ISI from narrow-band optical filtering. Optical communication systems employing such optical filter devices have improved optical transmission performance for one or more channels of multichannel optical signals transmitted in the system.

Those skilled in the art will appreciate that although a single frequency is illustrated in the inset plot of FIG. 7, the transmittance dip can be generated for multiple channels of a WDM transmission system to mitigate ISI from narrow-band optical filtering for multiple channels.

Figure 8:
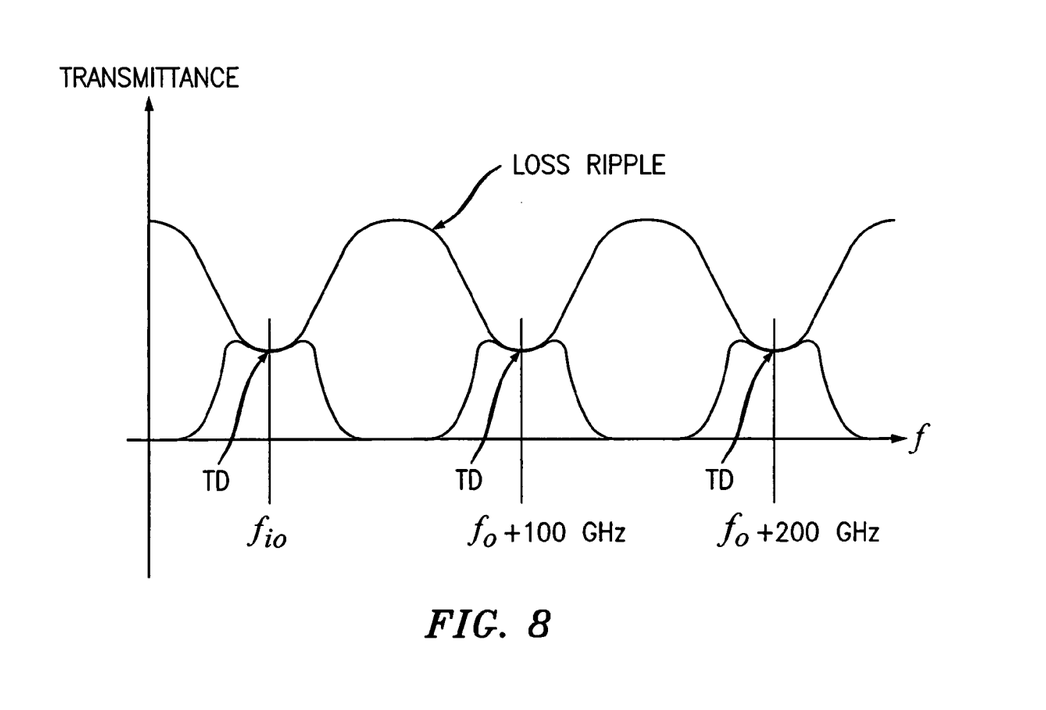
FIG. 8 is a plot illustrating aspects of the invention.

FIG. 8 is provided to illustrate the transmittance of a filter in accordance with an embodiment of the invention which exhibits a periodic transmittance dip (TD) with a periodicity of 100 GHz. The periodic transmittance dip may be generated by a sinusoidal loss ripple (as illustrated in FIG. 8). The loss ripple is preferably selected such that a transmittance dip occurs in the center of the filter's passband for multiple channels.

In one embodiment according to the present invention an apparatus for transmission of multichannel optical signals is provided. The apparatus comprises an optical filter device for narrow-band optical filtering. The optical filter device exhibits a desired loss ripple in the transmittance profile of the filter passband of the optical filter device to mitigate ISI from the narrow-band optical filtering. By mitigating the ISI the transmission performance is improved for one or more channels of the multichannel optical signals. The loss ripple preferably produces a transmittance dip in the center of the filter passband of the optical filter device.

The period, amplitude and phase of the loss ripple are preferably selected such that the transmission performance of the apparatus is improved. The period of the loss ripple is preferably equal to about the channel spacing of the multichannel optical signals divided by an integer. The transmittance dip is preferably about 0.4 dB for mitigating first-order ISI. It will be appreciated by those skilled in the art that the loss ripple may comprise multiple ripples with various frequencies, amplitude, and phases for mitigating multiple orders of ISI.

The narrow-band optical filter device may be, for example, an optical add-drop multiplexer, a multiplexer, a demultiplexer, an optical interleaver, or the like.

The narrow-band optical filter device preferably filters the optical signals such that $TD(dB) \approx 1.3(BR_{max}/\Delta f_{3-dB})^4$, where TD is the transmittance dip measured from a minimum transmission point in the transmission dip to the maximum transmission, $BR_{max}$ is the max bit rate, and $\Delta f_{3-dB}$ is the $_{3-dB}$ bandwidth.

In another embodiment according to the invention an optical transmission system for transmission of multichannel optical signals is provided. The system preferably comprises a plurality of optical filter devices for narrow-band optical filtering. The optical filter devices are preferably distributed within the transmission system. Each of the optical filter devices preferably exhibits a desired loss ripple in the transmittance profile of the filter passband of the optical filter device to mitigate ISI from the narrow-band optical filtering such that the transmission performance is improved for one or more channels of the multichannel optical signals.

The loss ripple exhibited by each of the optical filter devices preferably produces a transmittance dip in the center of the passband. The period of the loss ripple for each optical filter device is preferably equal to about the channel spacing of the multichannel optical signal divided by an integer. The period, amplitude and phase of the loss ripple for each optical filter device is preferably selected such that transmission performance is improved.

The loss ripple for each optical filter device may comprise a plurality of ripples with various frequencies, amplitude, and phases for mitigating multiple orders of ISI.

The narrow-band optical filter devices may be, for example, an optical add-drop multiplexer, a multiplexer, a demultiplexer, an optical interleaver or the like. The narrow-band optical filters preferably filter the optical signals such that $TD(dB) \approx 1.3(BR_{max}/\Delta f_{3-dB})^4$, where TD is the transmittance dip measured from a minimum transmission point in the transmission dip to the maximum transmission, $BR_{max}$ is the max bit rate, and $\Delta f_{3-dB}$ is the $_{3-dB}$ bandwidth.

In another embodiment according to the invention a method for optical transmission is provided. The method preferably comprises the step of narrow-band filtering a multichannel optical signal using an optical filter device. The optical filter device preferably exhibits a desired loss ripple in the transmittance profile of the filter passband of the optical filter device to mitigate ISI from the narrow-band filtering such that the transmission performance is improved for one or more channels of the multichannel optical signal.

The narrow-band optical filter preferably filters the optical signals such that $TD(dB) \approx 1.3(BR_{max}/\Delta f_{3-dB})^4$, where TD is the transmittance dip measured from a minimum transmission point in the transmission dip to the maximum transmission, $BR_{max}$ is the max bit rate, and $\Delta f_{3-dB}$ is the $_{3-dB}$ bandwidth.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for transmission of multichannel optical signals comprising: signal comprising:
   an optical filter device for narrow-band optical filtering, wherein the optical filter device exhibits a desired loss ripple in the transmittance profile of the filter passband of the optical filter device to mitigate intersymbol interference (ISI) from the narrow-band optical filtering such that the transmission performance is improved for one or more channels of the multichannel optical signals wherein the optical filter device filters the optical signals such that:

$$TD(\text{db}) \approx 1.3(BR_{max}/\Delta f_{3\text{-}dB})^4$$

where TD is the peak-to-peak amplitude of the transmittance dip, $BR_{max}$ is the maximum bit rate, and $\Delta f_{3\text{-}dB}$ is the 3-dB bandwidth.

2. The apparatus according to claim 1, wherein the loss ripple produces a transmittance dip in the center of the filter passband.

3. The apparatus according to claim 1, wherein the period, amplitude and phase of the loss ripple is selected such that the transmission performance is improved.

4. The apparatus according to claim 1, wherein the period of the loss ripple is equal to the channel spacing of the multichannel optical signals divided by an integer.

5. The apparatus according to claim 1, wherein the loss ripple comprises a plurality of ripples having various frequencies, amplitudes, and phases for mitigating multiple orders of ISI.

6. The apparatus according to claim 1, wherein the optical filter device is a device selected from the group consisting of an optical add-drop multiplexer, a multiplexer, a demultiplexer, and an optical interleaver.

7. An optical transmission system for transmission of multichannel optical signals comprising:
   a plurality of optical filter devices for narrow-band optical filtering distributed within the transmission system, wherein each of the optical filter devices exhibits a desired loss ripple in the transmittance profile of the filter passband of the optical filter device to mitigate intersymbol interference (ISI) from the narrow-band optical filtering such that the transmission performance is improved for one or more channels of the multichannel optical signals wherein the narrow-band optical filter devices filter the optical signals such that:

$$TD(\text{db}) \approx 1.3(BR_{max}/\Delta f_{3\text{-}dB})^4$$

where TD is the peak-to-peak amplitude of the transmittance dip, $BR_{max}$ is the maximum bit rate, and $\Delta f_{3\text{-}dB}$ is the 3-dB bandwidth.

8. The optical transmission system according to claim 7, wherein the loss ripple exhibited by each of the optical filter devices produces a transmittance dip in the center of the filter passband.

9. The optical transmission system according to claim 7, wherein the period, amplitude and phase of the loss ripple for each optical filter device is selected such that transmission performance is improved.

10. The optical transmission system according to claim 7, wherein the period of the loss ripple for each optical filter device is equal to the channel spacing of the multichannel optical signals divided by an integer.

11. The optical transmission system according to claim 7, wherein the loss ripple for each optical filter device comprises a plurality of ripples having various frequencies, amplitudes, and phases for mitigating multiple orders of ISI.

12. The optical transmission system according to claim 7, wherein the optical filter devices are devices selected from the group consisting of an optical add-drop multiplexer, a multiplexer, a demultiplexer, and an optical interleaver.

13. A method for optical transmission comprising:
    narrow-band filtering a multichannel optical signal using an optical filter device, wherein the optical filter device exhibits a desired loss ripple in the transmittance profile of the filter passband of the optical filter device to mitigate intersymbol interference (ISI) from the narrow-band filtering such that the transmission performance is improved for one or more channels of the multichannel optical signal wherein the optical filter device filters the multichannel optical signal such that:

$$TD(\text{db}) \approx 1.3(BR_{max}/\Delta f_{3\text{-}dB})^4$$

where TD is the peak-to-peak amplitude of the transmittance dip, $BR_{max}$ is the maximum bit rate, and $\Delta f_{3\text{-}dB}$ is the 3-dB bandwidth.

* * * * *